United States Patent [19]
Schaffer

[11] Patent Number: 5,611,244
[45] Date of Patent: Mar. 18, 1997

[54] ELECTRONIC PRESSURE MODIFIER

[76] Inventor: Larry Schaffer, 5905 Magnolia La., Lakeland, Fla. 33809

[21] Appl. No.: 526,111

[22] Filed: Sep. 8, 1995

Related U.S. Application Data

[63] Continuation-in-part of Ser. No. 51,977, Apr. 26, 1993, Pat. No. 5,467,644.

[51] Int. Cl.$^6$ ..................................................... F16H 61/00
[52] U.S. Cl. ........................................ 74/335; 200/61.91
[58] Field of Search ............................. 74/335; 200/61.91

[56] References Cited

U.S. PATENT DOCUMENTS 4,966,044  10/1990  Bowman et al. ........................ 74/335
5,467,644  11/1995  Schaffer ................................. 73/118.1

Primary Examiner—Dirk Wright
Attorney, Agent, or Firm—George A. Bode

[57] ABSTRACT

An apparatus for modifying the pressure of an electronically controlled automatic transmission including an electronic pressure controlled (EPC) solenoid, comprising: a pair of leads connected in parallel to the leads of the EPC solenoid; a pair of resistors, of fixed but differing resistance, connected to one of the leads; and, a switch connected to the other lead for selectively connecting the leads through the resistors to the leads of the EPC solenoid, the switch being movable between a plurality of positions to change the resistance wherein the transmission pressure changes.

3 Claims, 3 Drawing Sheets

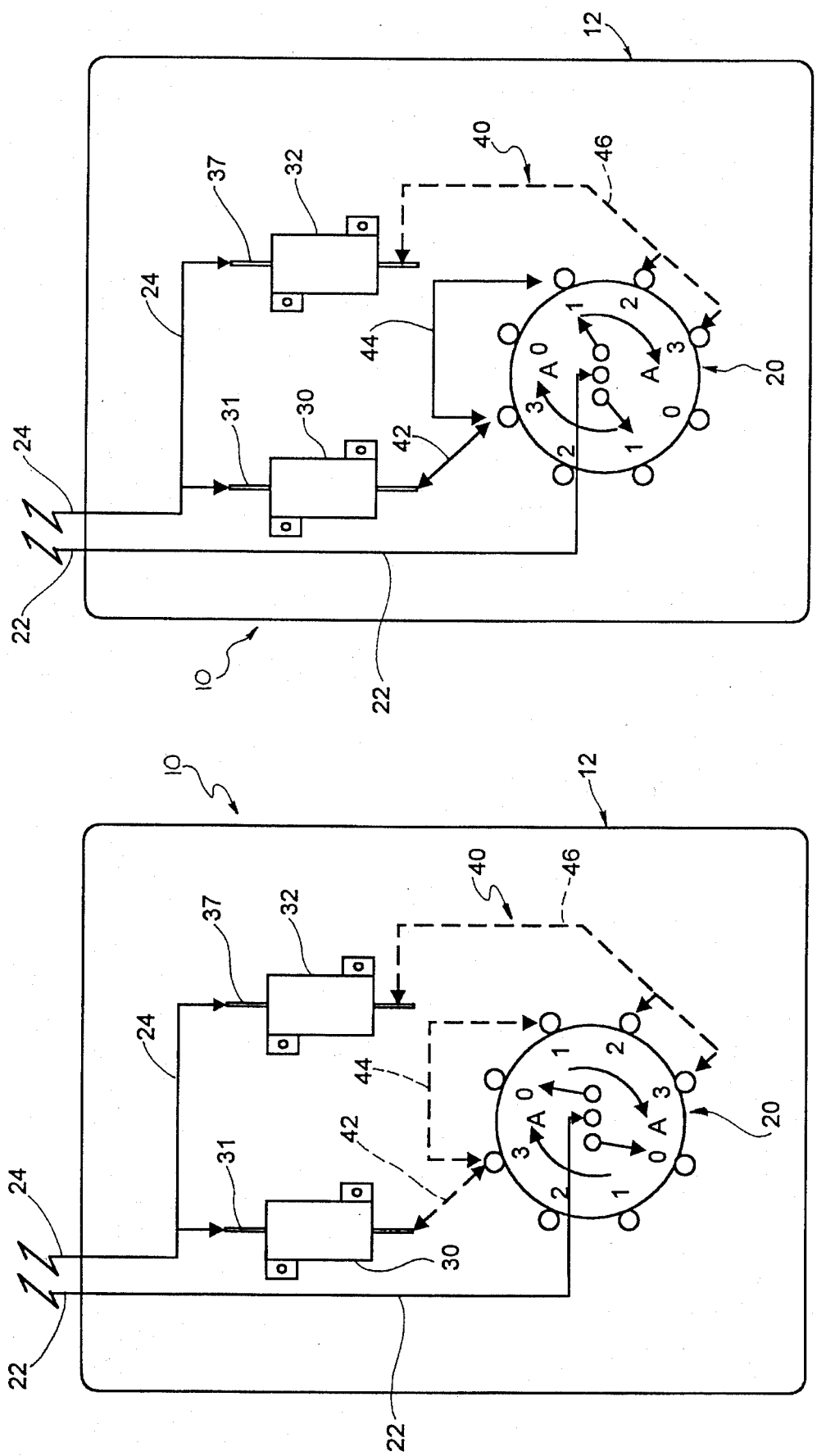

ELECTRONIC PRESSURE MODIFIER

This application is a continuation-in-part application of a previous application by the same inventor bearing U.S. Ser. No. 08/051,977 filed Apr. 26, 1993, now U.S. Pat. No. 5,467,644. The entire previous application Ser. No. 08/051,977 is incorporated herein by reference as if set forth in full below.

BACKGROUND OF THE INVENTION

The present invention relates to an apparatus for modifying the pressure of electronically (computer) controlled automatic transmissions.

SUMMARY OF THE PRESENT INVENTION

An apparatus for modifying the pressure of an electronically controlled automatic transmission including an electronic pressure controlled (EPC) solenoid, comprising: a pair of leads connected in parallel to the leads of the EPC solenoid; a pair of resistors, of fixed but differing resistance, connected in parallel to one of the leads; and, a rotary switch connected to the other lead for selectively connecting the leads through the resistors to the leads of the EPC solenoid, the switch being movable between a plurality of positions to change the resistance wherein the transmission pressure changes.

In view of the above, it is an object of the present invention to provide an apparatus for changing the pressure of an electronically controlled automatic transmission by parallel connection of resistors with the electronic pressure controlled solenoid of the transmission.

It is a further object of the present invention to extend transmission life by improving shifting and increasing line pressure.

BRIEF DESCRIPTION OF THE DRAWING

For a further understanding of the nature and objects of the present invention, reference should be had to the following description taken in conjunction with the accompanying drawing in which like parts are given like reference numerals and, wherein:

FIG. 2 is a schematic illustration of the embodiment of FIG. 1 in the "OFF" position;

FIG. 3 is a schematic illustration of the embodiment of FIG. 1 in one of its "ON" positions to provide resistance and pressure to the transmission;

DETAILED DESCRIPTION OF THE PREFERRED EMBODIMENT

Figure 1:
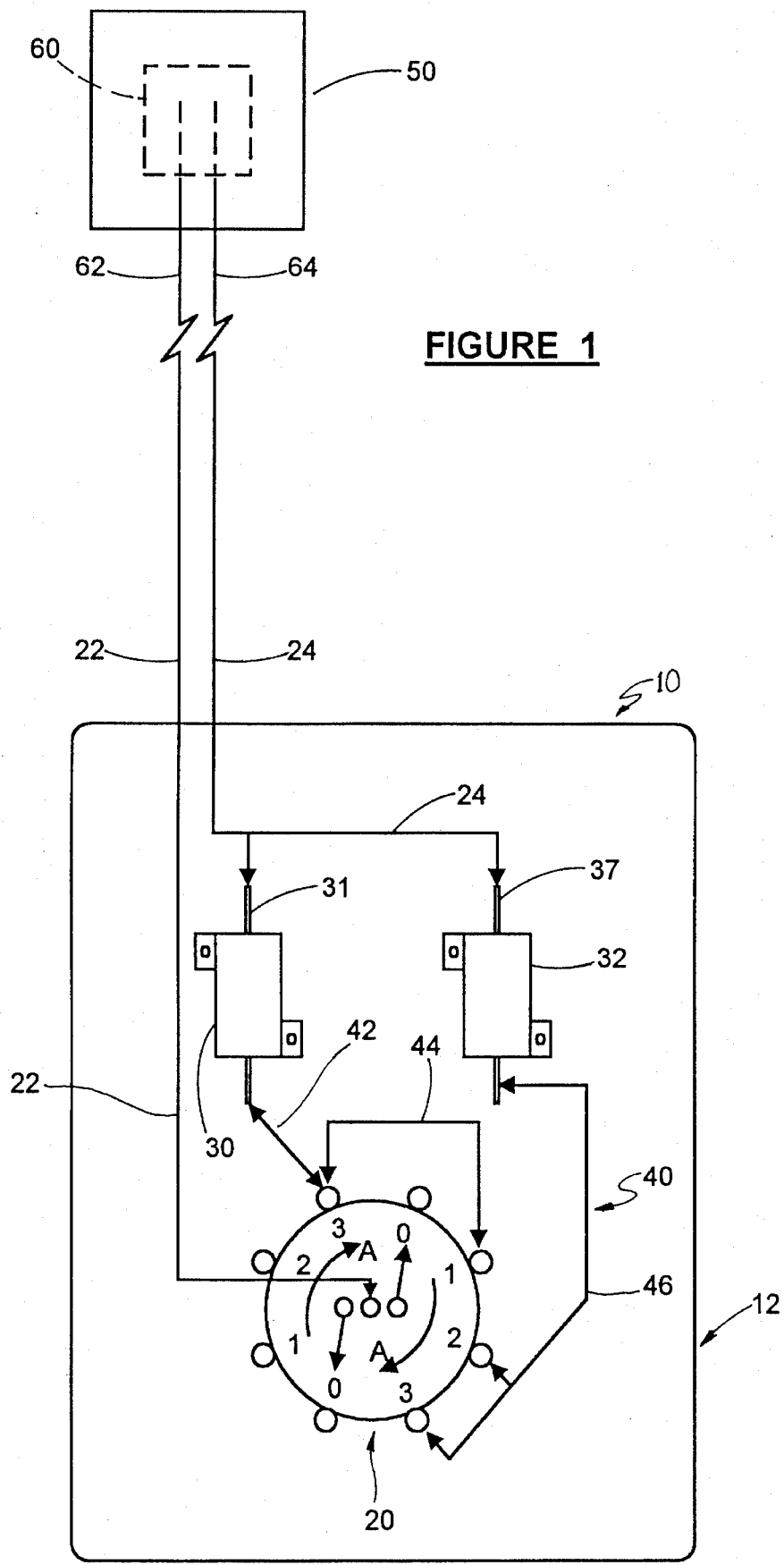
FIG. 1 is a schematic illustration of the preferred embodiment of the apparatus of the present invention.

Referring now to the drawing, and in particular FIG. 1, the apparatus of the present invention is designated generally by the numeral 10. The apparatus of the present invention 10 provides for modifying the pressure of an electronically pressure controlled automatic transmission 50 by providing, in parallel circuitry with the electronic pressure controlled (EPC) solenoid 60 of the transmission 50, selective variable (fixed but different) resistance 30, 32.

Apparatus 10 is comprised of a housing 12 which has therein rotary switch 20 which is a two-pole, four position (4 positive and 4 negative) switch which is connected to lead wire 22. Further provided are fixed resistors 30, 32, resistor 30 being of a greater resistance than resistor 32. In the preferred embodiment, resistor 30 has a resistance of 56 $\Omega$(ohms) ($\pm 10\ \Omega$) and resistor 32 has a value of 33 $\Omega$($\pm 5\ \Omega$). Resistors 30, 32 are connected in parallel to lead wire 24. Lead wires 22, 24 exit housing 12 for connection to the leads 62, 64 of electronic pressure controlled solenoid 60 of electronic transmission 50 to be affected. Means 40 is provided for selective electrical connection of lead wire 22 to lead wire 24 and comprises wiring 42, 44 and 46 and the various pole positions (designated 0–3 for each pole of switch 20).

Computers often run the pressure too low in transmissions. By modifying the signal to the transmission solenoid 60, the pressure signal to the transmission 50 changes. In operation, rotary switch 20, when in the position of FIG. 2 (switch positions "0"), provides for no functions as leads 22, 24 are not connected (phantom wiring 42, 44, 46) and the circuit is open. When rotary switch 20 is turned in the clockwise direction of ARROWS A to the position of FIG. 3 (switch positions "1"), lead wire 22 is connected to resistor 30 via wiring 42, 44. Resistor 30 is, in turn, connected to lead wire 24 via wiring 31. Since lead wires 22, 24 are connected to the lead wires 62, 64, respectively, of solenoid 60 of transmission 50, resistor 30 is now in parallel connection with the transmission EPC solenoid 60. This causes a small pressure rise in the transmission 50.

Figure 4:
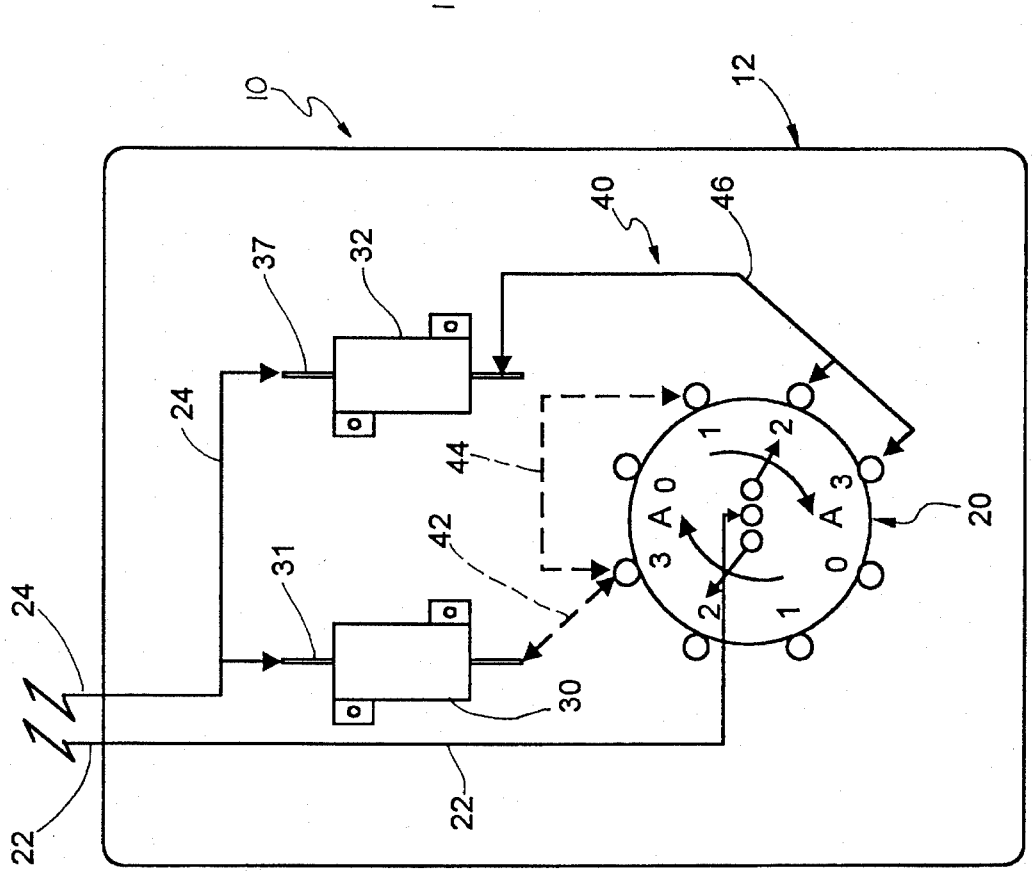
FIG. 4 is a schematic illustration of the embodiment of FIG. 1 in another of its "ON" positions, the resistance being lower than that shown in FIG. 3 to provide a pressure increase in the transmission; and, FIG. 5 is a schematic illustration of the embodiment of FIG. 1 in yet another of its "ON" positions, the resistance being lower than that shown in FIG. 4 to provide a further pressure increase in the transmission.

Turning switch 20 further clockwise in the direction of ARROWS A to the position of FIG. 4, (positions "2" of rotary switch 20), connects lead wire 22 to lead wire 24 through resistor 32 via wiring 46 and wiring 37, and since resistor 32 has a lower resistance than resistor 30, this causes a slightly higher pressure rise in transmission 50.

Figure 5:
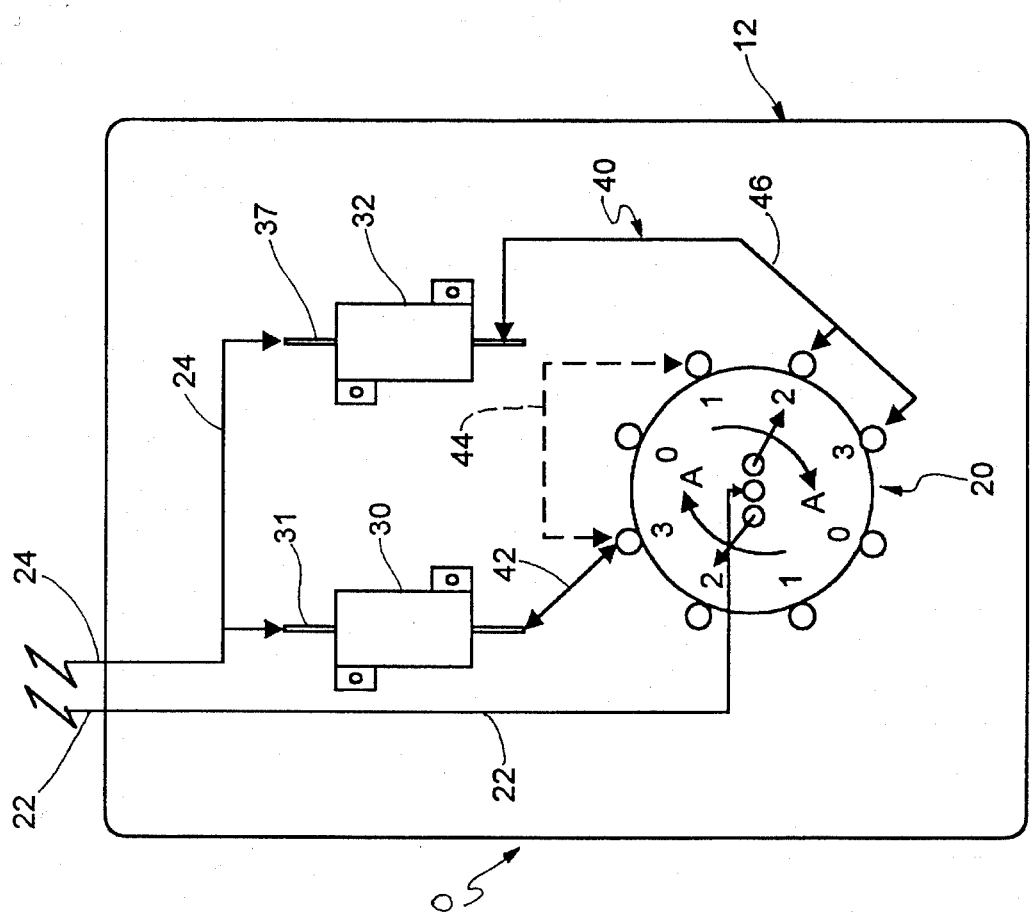

Turning rotary switch 20 further clockwise, in the direction of ARROWS A to the position of FIG. 5, (positions "3" of rotary switch 20) connects lead wires 22, 24 through both resistors 30, 32, via wiring 42, 46, respectively, and 31, 37 respectively, which creates the lowest resistance and the greatest transmission pressure of the three "ON" positions.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. An apparatus for modifying the pressure of an electronically pressure controlled automatic transmission which includes an electronic pressure controlled (EPC) solenoid having a pair of leads comprising:

(a) first and second leads connected in parallel to the leads of said EPC solenoid;

(b) first and second resistors of differing resistance connected in parallel to one of said leads; and, (c) a switch connected to the other of said leads for selectively connecting said leads through at least one of said resistors, said switch being movable between a plurality of positions to thereby change the resistance wherein the transmission pressure changes.

2. An apparatus for modifying the pressure of an electronically pressure controlled automatic transmission which includes an electronic pressure controlled (EPC) solenoid having a pair of leads comprising:

(a) first and second leads connected in parallel to the leads of said EPC solenoid;

(b) first and second resistors of differing resistance connected in parallel to one of said leads; and, (c) a switch connected to the other of said leads for selectively connecting said leads through at least one of said resistors, said switch being movable between:
  i. a first position wherein said leads are unconnected;
  ii. a second position wherein said leads are connected through one of said resistors wherein said transmission pressure increases; and,
  iii. a third position wherein said leads are connected to both of said resistors wherein said transmission pressure is greater than the other positions.

3. An apparatus for modifying the pressure of an electronically controlled automatic transmission which includes an electronic pressure controlled (EPC) solenoid comprising:

(a) first and second leads connected in parallel to the leads of said EPC solenoid;

(b) first and second resistors of fixed but differing resistance values connected in parallel to one of said leads; and, (c) a switch connected to the other of said leads for selectively connecting said leads through at least one of said resistors, said switch being movable between:
  i. a first position wherein said leads are unconnected;
  ii. a second position wherein said leads are connected through said resistor having the greatest resistance, wherein said transmission pressure increases;
  iii. a third position wherein said leads are connected through said resistor having the least resistance, wherein said transmission pressure is greater than in said second position; and,
  iv. a fourth position wherein said leads are connected to both of said resistors wherein said transmission pressure is greater than the other positions.

* * * * *